US012704717B2

(12) United States Patent
Gomer et al.

(10) Patent No.: US 12,704,717 B2
(45) Date of Patent: Aug. 11, 2026

(54) COMPOSITE PANE WITH A HOLOGRAPHIC ELEMENT AND METHOD FOR THE PRODUCTION THEREOF

(71) Applicant: SAINT-GOBAIN GLASS FRANCE, Courbevoie (FR)

(72) Inventors: Andreas Gomer, Kerpen (DE); Raphaela Perlewitz, Aachen (DE); Adrien Ceripa, Versailles (FR); Daniel Krekel, Aachen (DE)

(73) Assignee: SAINT-GOBAIN SEKURIT FRANCE, Thourotte (FR)

( * ) Notice: Subject to any disclaimer, the term of this patent is extended or adjusted under 35 U.S.C. 154(b) by 519 days.

(21) Appl. No.: 18/010,401

(22) PCT Filed: Jun. 10, 2021

(86) PCT No.: PCT/EP2021/065624

§ 371 (c)(1),
(2) Date: Dec. 14, 2022

(87) PCT Pub. No.: WO2021/254873

PCT Pub. Date: Dec. 23, 2021

(65) Prior Publication Data

US 2023/0228993 A1 Jul. 20, 2023

(30) Foreign Application Priority Data

Jun. 15, 2020 (EP) .................................... 20179983

(51) Int. Cl.
*G02B 27/01* (2006.01)
*B32B 7/023* (2019.01)
(Continued)

(52) U.S. Cl.
CPC .......... *G02B 27/0103* (2013.01); *B32B 7/023* (2019.01); *B32B 7/12* (2013.01);
(Continued)

(58) Field of Classification Search
CPC .......... G03H 1/00; G03H 1/0005; G03H 1/02; G03H 1/024; G03H 1/0248; G03H 1/0252;
(Continued)

(56) References Cited

U.S. PATENT DOCUMENTS 5,066,525 A 11/1991 Nakamachi et al.
2010/0104862 A1 * 4/2010 Miller .................... B32B 27/36 524/413
(Continued)

FOREIGN PATENT DOCUMENTS

AU 2530995 A 3/1996
DE 10 2012 211 729 A1 1/2014
(Continued)

OTHER PUBLICATIONS

Berry, 'A technical guide to one-component and two-component polyurethane adhesive systems', Chemique Adhesives, https://www.chemiqueadhesives.com/us/polyurethane-adhesives-technical-paper, Jul. 2020. (Year: 2020).*
(Continued)

*Primary Examiner* — Arnel C Lavarias
(74) *Attorney, Agent, or Firm* — CUSHMAN PARTNERS, LLC

(57) ABSTRACT

A composite pane includes first and second panes, a layer stack arranged therebetween including a first thermoplastic intermediate layer, a separating layer, an adhesive layer, a photopolymer layer having a holographic element, a carrier layer, and a second thermoplastic intermediate layer. The carrier layer contains polyethylene terephthalate, polyethylene, polymethyl methacrylate, polyvinyl chloride, and/or cellulose triacetate and has a thickness of 20 μm to 100 μm. The carrier layer is arranged directly adjacent the photopolymer layer. The separating layer contains polyethylene
(Continued)

Figure 1:
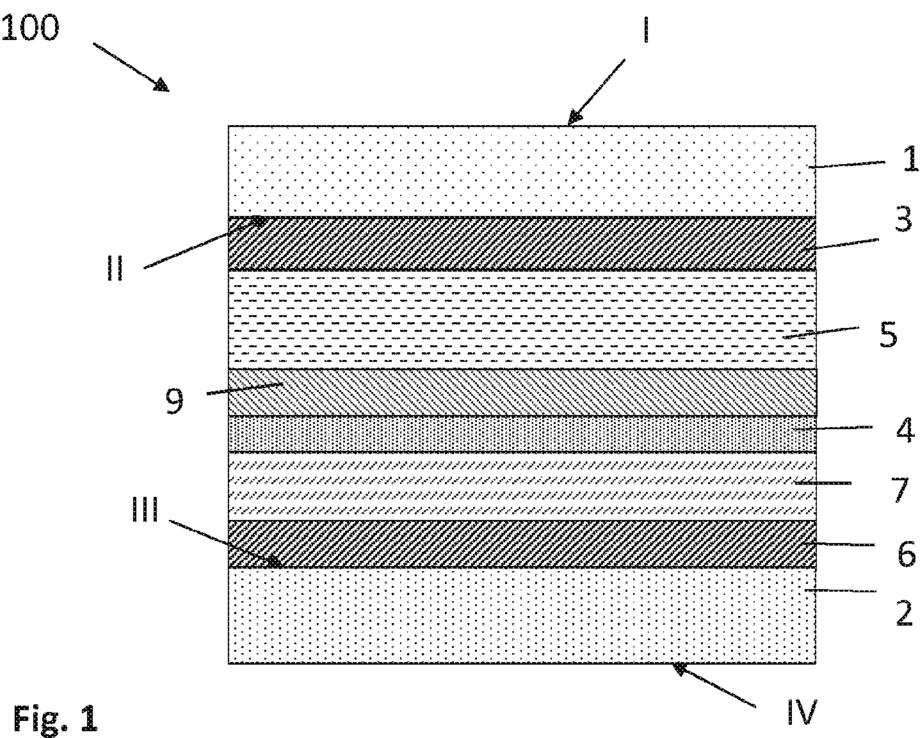

terephthalate, polyethylene, polymethyl methacrylate, polycarbonate, polyamide, polyvinyl chloride, and/or cellulose triacetate and has a thickness of 10 μm to 300 μm. The adhesive layer is arranged directly adjacent the photopolymer layer and the separating layer.

20 Claims, 2 Drawing Sheets

(51) Int. Cl.
*B32B 7/12* (2006.01)
*B32B 17/10* (2006.01)
*B32B 27/08* (2006.01)

(52) U.S. Cl.
CPC .. *B32B 17/10706* (2013.01); *B32B 17/10743* (2013.01); *B32B 17/10779* (2013.01); *B32B 27/08* (2013.01); *B32B 2250/05* (2013.01); *B32B 2419/00* (2013.01); *B32B 2605/00* (2013.01)

(58) Field of Classification Search
CPC .. G03H 1/0256; G03H 1/0272; G03H 1/0486; G03H 1/18; G03H 2250/00; G03H 2250/12; G03H 2250/35; G03H 2250/37; G03H 2250/39; G03H 2260/12; G02B 27/0103; G02B 5/32; G02B 27/01; G02B 27/0101; G02B 2027/0105; G02B 2027/0109; B32B 7/023; B32B 17/10706; B32B 17/10743; B32B 17/10779; B32B 27/08; B32B 2250/05; B32B 2419/00; B32B 2605/00
USPC .................... 359/15, 1, 13, 32, 33; 430/1, 2
See application file for complete search history.

(56) References Cited

U.S. PATENT DOCUMENTS

| | | | |
|---|---|---|---|
| 2019/0056596 A1 | 2/2019 | Bailey et al. | |
| 2019/0101865 A1 | 4/2019 | Popkova et al. | |
| 2022/0161525 A1* | 5/2022 | Koran | B32B 17/10633 |
| 2022/0229395 A1* | 7/2022 | Koran | G03H 1/0248 |
| 2023/0311457 A1* | 10/2023 | Gomer | B32B 27/22 359/13 |

FOREIGN PATENT DOCUMENTS

| | | | | |
|---|---|---|---|---|
| EP | 0 420 228 B1 | | 3/1995 | |
| EP | 1 438 634 B1 | | 3/2011 | |
| GB | 2284212 A | * | 5/1995 | B32B 17/10036 |
| JP | H07-315893 A | | 12/1995 | |
| WO | WO 96/04610 A1 | | 2/1996 | |
| WO | WO 2011/054797 A1 | | 5/2011 | |
| WO | WO 2012/156124 A1 | | 11/2012 | |
| WO | WO 2018/206503 A1 | | 11/2018 | |

OTHER PUBLICATIONS

D.M. Segura, A.D. Nurse, A. McCourt, R. Phelps, A. Segura, 'Chapter 3: Chemistry of polyurethane adhesives and sealants', Handbook of Adhesives and Sealants, vol. 1, pp. 101-162, 2005. (Year: 2005).*

International Search Report as issued in International Patent Application No. PCT/EP2021/065624, dated Jul. 5, 2021.

First Office Action and Search Report as issued in Chinese Patent Application No. 202180002275.7, dated Apr. 14, 2023.

* cited by examiner

COMPOSITE PANE WITH A HOLOGRAPHIC ELEMENT AND METHOD FOR THE PRODUCTION THEREOF

CROSS-REFERENCE TO RELATED APPLICATIONS

This application is the U.S. National Stage of PCT/EP2021/065624, filed Jun. 10, 2021, which in turn claims priority to European patent application number 20 179 983.0 filed Jun. 15, 2020. The content of these applications are incorporated herein by reference in their entireties.

The invention relates to a composite pane with a holographic element, a method for the production of such a composite pane, and the use of such a composite pane.

Composite panes are currently used in many places, in particular in the vehicle sector. Here, the term "vehicle" includes, among other things, road vehicles, aircraft, watercraft, agricultural machinery, or even work equipment. Composite panes are also used in other sectors. These include, for example, architectural glazings or information displays, e.g., in museums or as advertising displays.

In vehicles, composite panes are also used as head-up displays (HUD) for displaying information. A head-up display is a display system, in which the viewer can maintain his/her line of sight because the visual information is projected into his/her field of vision. An image is projected by means of a projection apparatus onto the composite glass pane to insert information into the field of vision of the viewer. In the vehicle sector, the projection apparatus is, for example, arranged on the dashboard such that the projected image is reflected on the nearest glass surface of the composite glass pane inclined in the direction of the viewer (cf., e.g., the European patent EP 0 420 228 B1 or the German published application DE 10 2012 211 729 A1).

Reflection holograms that are laminated between the panes of a composite pane can be used for head-up displays. The reflection hologram can contain information recorded therein. The hologram can be activated by means of light emitted from a projector and thus the information recorded in the hologram can be reproduced for the viewer. Head-up displays comprising holographic optical elements are disclosed, for example, in the publications WO 2012/156124 A1 and US 2019/0056596 A1.

In the production of laminated panes with a holographic optical element, a layer of photopolymers is generally laminated between two panes. The lamination usually requires two layers of thermoplastic polymers, such as polyvinyl butyral, between which the photopolymer layer is arranged. These thermoplastic polymers often contain plasticizers or other compounds that can diffuse into the photopolymer layer. This can cause the photopolymer layer to swell or shrink, adversely affecting the holographic optical element. This effect is particularly strong when the holographic optical element is already contained in the photopolymer layer before lamination. This results in the hologram not being visible after lamination under the same conditions (the same laser and the same eyebox) as intended when the holographic optical element was produced. Another layer, which serves to protect the photopolymer layer, can be arranged between the photopolymer layer and the thermoplastic intermediate layer. The adhesion between these two layers is often not particularly good. This can result in delamination, i.e., in the detachment of the layers in the composite pane, rendering the composite pane unusable.

US 2019/0101865 A1 describes a method for producing a laminated holographic display in which a photopolymer layer is laminated between two glass panes using polymer layers. In this case, the exposure of the photopolymer layer, by which the holographic optical element is produced, takes place after the lamination step such that the entire lamination of the composite pane must be done in the dark. This is technically difficult and costly.

U.S. Pat. No. 5,066,525 A describes a windshield with a hologram film laminated between two panes, wherein one or two PVB layers can be used to join the panes.

JP H07315893 A describes a composite pane with two hologram films that are embedded between the two individual panes by lamination with multiple intermediate layers. The construction with two hologram films is quite complex since multiple carrier layers are required during production.

The object of the present invention is to provide an improved composite pane having a holographic optical element that is simple to manufacture and to provide a simple method for producing the composite pane.

The object of the present invention is accomplished according to the invention by a composite pane in accordance with claim 1. A projection assembly and a method for the production of the composite pane and use thereof are apparent from further independent claims. Preferred embodiments are apparent from the subclaims.

The invention relates to a composite pane at least comprising a first pane, a first thermoplastic intermediate layer, a photopolymer layer with a holographic optical element, a second thermoplastic intermediate layer, and a second pane. According to the invention, the composite pane also has a separating layer that is arranged between the photopolymer layer and the first thermoplastic intermediate layer. This separating layer prevents plasticizers and other components from diffusing out of the thermoplastic intermediate layer into the photopolymer layer with the holographic optical element and causing swelling or shrinkage of the photopolymer there. An adhesive layer is arranged between the separating layer and the photopolymer layer. This adhesive layer prevents delamination of the layers due to poor adhesion between the separating layer and the photopolymer layer. The adhesive layer is arranged directly adjacent the photopolymer layer and the separating layer, i.e., no other layers are situated between the photopolymer layer and the adhesive layer and between the adhesive layer and the separating layer. The photopolymer layer is preferably used in conjunction with a carrier layer, which is arranged in the composite pane according to the invention between the second thermoplastic intermediate layer and the photopolymer layer. This carrier layer is provided, on the one hand, as a carrier film for a photopolymer layer and can, at the same time, serve as a diffusion barrier layer, which prevents penetration of plasticizers out of the thermoplastic intermediate layer into the photopolymer layer. This yields a preferred layer stack with the following order: (first pane)-first thermoplastic intermediate layer-separating layer-adhesive layer-photopolymer layer having a holographic element-carrier layer-second thermoplastic intermediate layer-(second pane). Additional layers can be contained in the layer stack.

Preferably, the layer stack includes only a single photopolymer layer. This simplifies the construction of the pane.

In a first preferred embodiment, the composite pane comprises at least a first pane, a second pane, a layer stack arranged therebetween, at least comprising the following layers in order from the first pane to the second pane: a first thermoplastic intermediate layer, a separating layer, an adhesive layer, a photopolymer layer having at least one holographic element, a carrier layer, and a second thermoplastic intermediate layer. The carrier layer contains polyethylene terephthalate (PET), polyethylene (PE), polymethyl methacrylate (PMMA), polyvinyl chloride (PVC), and/or cellulose triacetate (TAC) and has a thickness of 20 μm to 100 μm. The carrier layer is arranged directly adjacent the photopolymer layer. The separating layer contains polyethylene terephthalate (PET), polyethylene (PE), polymethyl methacrylate (PMMA), polycarbonate (PC), polyamide (PA), polyvinyl chloride (PVC), and/or cellulose triacetate (TAC) and has a thickness of 10 μm to 300 μm. The adhesive layer is arranged directly adjacent the photopolymer layer and the separating layer. Thanks to the combination according to the invention of carrier layer, adhesive layer, and separating layer, a stable composite pane is obtained after lamination without negatively affecting the holographic element in the photopolymer layer, which is easy to produce.

Preferably, the carrier layer consists essentially of polyethylene terephthalate (PET), polyethylene (PE), polymethyl methacrylate (PMMA), polyvinyl chloride (PVC), or cellulose triacetate (TAC), particularly preferably of polyethylene terephthalate (PET). These materials give the photopolymer layer mechanical stability for easy further processing and act, at the same time, as a barrier against the diffusion of plasticizers or other additives out of the thermoplastic intermediate layer.

Preferably, the carrier layer has a thickness of 40 μm to 90 μm, preferably of 65 μm to 80 μm. These thicknesses are particularly suitable for fulfilling an effective barrier function against plasticizers or other additives from the thermoplastic intermediate layer.

Preferably, the separating layer consists essentially of polyethylene terephthalate (PET), polyethylene (PE), polymethyl methacrylate (PMMA), polycarbonate (PC), polyamide (PA), polyvinyl chloride (PVC), or cellulose triacetate (TAC), particularly preferably of polymethyl methacrylate (PMMA). These separating layers act as an excellent diffusion barrier for plasticizers or other additives out of the first thermoplastic intermediate layer.

Preferably, the separating layer has a thickness of 40 μm to 200 μm, particularly preferably of 65 μm to 150 μm.

In a second preferred embodiment, the composite pane comprises at least a first pane, a second pane, a layer stack arranged therebetween, at least comprising the following layers in order from the first pane to the second pane: a first thermoplastic intermediate layer, a separating layer, an adhesive layer, a photopolymer layer having at least one holographic element, a carrier layer, and a second thermoplastic intermediate layer. The carrier layer contains polyamide and has a thickness of 20 μm to 100 μm. The carrier layer is arranged directly adjacent the photopolymer layer. The separating layer contains polyethylene (PE), polymethyl methacrylate (PMMA), polycarbonate (PC), polyvinyl chloride (PVC), and/or cellulose triacetate (TAC) and has a thickness of 10 μm to 300 μm. The adhesive layer is arranged directly adjacent the photopolymer layer and the separating layer. Thanks to the combination according to the invention of carrier layer, adhesive layer, and separating layer, a stable composite pane is obtained after lamination without negatively affecting the holographic element in the photopolymer layer, which is easy to produce.

Preferably, the carrier layer consists essentially of polyamide (PA). Polyamide gives the photopolymer layer the necessary mechanical stability for easy further processing and acts, at the same time, as an effective barrier against the diffusion of plasticizers or other additives out of the thermoplastic intermediate layer.

Preferably, the carrier layer has a thickness of 40 μm to 90 μm, particularly preferably of 65 μm to 80 μm. These thicknesses are particularly suitable for fulfilling an effective barrier function against plasticizers or other additives out of the thermoplastic intermediate layer.

Preferably, the separating layer consists essentially of polyethylene (PE), polymethyl methacrylate (PMMA), polycarbonate (PC), polyvinyl chloride (PVC), or cellulose triacetate (TAC), particularly preferably of polymethyl methacrylate (PMMA). These separating layers act as an excellent diffusion barrier for plasticizers or other additives out of the first thermoplastic intermediate layer.

Preferably, the separating layer has a thickness of 40 μm to 200 μm, particularly preferably of 65 μm to 150 μm.

In a third preferred embodiment, the composite pane comprises at least a first pane, a second pane, a layer stack arranged therebetween, at least comprising the following layers in order from the first pane to the second pane: a first thermoplastic intermediate layer, a separating layer, an adhesive layer, a photopolymer layer having at least one holographic element, a carrier layer, and a second thermoplastic intermediate layer. The carrier layer contains polycarbonate (PC) and has a thickness of 20 μm to 100 μm. The carrier layer is arranged directly adjacent the photopolymer layer. The separating layer contains polyethylene terephthalate (PET), polyethylene (PE), polymethyl methacrylate (PMMA), polycarbonate (PC), polyvinyl chloride (PVC), and/or cellulose triacetate (TAC) and has a thickness of 10 μm to 300 μm. The adhesive layer is arranged directly adjacent the photopolymer layer and the separating layer. Thanks to the combination according to the invention of carrier layer, adhesive layer, and separating layer, a stable composite pane is obtained after lamination without negatively affecting the holographic element in the photopolymer layer, which is easy to produce.

Preferably, the carrier layer consists essentially of polycarbonate (PC). Polycarbonate gives the photopolymer layer the necessary mechanical stability for easy further processing and acts, at the same time, as an effective barrier against the diffusion of plasticizers or other additives out of the thermoplastic intermediate layer.

Preferably, the carrier layer has a thickness of 40 μm to 90 μm, particularly preferably of 65 μm to 80 μm. These thicknesses are particularly suitable for fulfilling an effective barrier function against plasticizers or other additives out of the thermoplastic intermediate layer.

Preferably, the separating layer consists essentially of polyethylene terephthalate (PET), polyethylene (PE), polymethyl methacrylate (PMMA), polycarbonate (PC), polyvinyl chloride (PVC), or cellulose triacetate (TAC), particularly preferably of polymethyl methacrylate (PMMA). These separating layers act as an excellent diffusion barrier for plasticizers or other additives out of the first thermoplastic intermediate layer.

Preferably, the separating layer has a thickness of 40 μm to 200 μm, particularly preferably of 65 μm to 150 μm.

The following statements concerning the composite pane and its components refer to all three preferred embodiments described above.

The adhesive layer, which is arranged between the photopolymer layer and the separating layer, is preferably a so-called optically clear adhesive (OCA) or a transparent adhesive. Such adhesives are characterized by high light transmittance, low haze, no birefringence, high UV resistance, and good aging resistance. Uncontrolled and therefore undesirable impairments of light transmittance or unaesthetic distortions can thus be avoided. The adhesive layer preferably has absorption in the visible spectral range of less than 5%, in particular less than 2%, or even 1% and preferably has haze of less than 5%, in particular less than 2%, or even 1%.

The layer of adhesive is preferably implemented as a homogeneous layer.

The layer of adhesive preferably has a thickness of 20 μm to 200 μm, particularly preferably of 50 μm to 150 μm, most particularly preferably of 60 μm to 100 μm. This effectively prevents delamination between the separating layer and the photopolymer layer and achieves good optical properties. In addition, adhesive layers with these thicknesses are commercially available as adhesive films.

The adhesive is preferably a chemically acting, in particular a chemically curing adhesive or UV curing, particularly preferably an acrylate adhesive or a silicone-based adhesive. The layer of adhesive is, in particular, not a thermoplastically acting adhesive film, i.e., not a thermoplastic film, which, after heating, causes bonding of the optical filter to the pane surface, such as the thermoplastic films of the thermoplastic intermediate layer of the composite glass pane.

The first pane and the second pane have in each case an exterior-side surface, i.e., an outer surface, and an interior-side surface, i.e., an inner surface, and a peripheral side edge extending therebetween. In the context of the invention, "outer surface" refers to that primary surface that is intended to face the external surroundings in the installed position. In the context of the invention, "inner surface" refers to that primary surface that is intended to face the interior in the installed position. The inner surface of the first pane and the outer surface of the second pane face one another in the composite pane according to the invention.

If the composite pane is intended, in a window opening of a vehicle or a building, to separate an interior from the external surroundings, "inner pane" refers, in the context of the invention, to the pane facing the interior (vehicle interior). "Outer pane" refers to the pane facing the external surroundings. The first pane can be the outer pane or the inner pane and the second pane can be the outer pane or the inner pane. Preferably, the first pane is the outer pane; and the second pane, the inner pane.

The photopolymer layer consists of a layer of photopolymer and includes a holographic element. The holographic element is recorded there by means of laser interference or introduced by an embossing process. Suitable photopolymers are known to the person skilled in the art and are described, for example, in EP1438634B1, in WO2011054797A1, and WO2018206503A1. Cross-linked polyurethanes are preferred.

The photopolymer layer preferably has a thickness between 5 μm and 70 μm, preferably between 10 μm and 50 μm, particularly preferably between 15 μm and 20 μm. These thicknesses are particularly advantageous for the optical quality of the holographic element.

In addition, it is advantageous to reduce the thickness of the comparatively expensive photopolymer layer and to use it in combination with a less expensive carrier layer.

The photopolymer layer is preferably directly adjacent the carrier layer. The photopolymer layer is applied directly to the carrier layer in order to obtain a film with sufficient mechanical stability for further processing. Delamination effects are also prevented without requiring additional adhesive layers between the photopolymer layer and the carrier layer.

Preferably, the layer stack arranged between the first pane and the second pane consists of the following layers: a first thermoplastic intermediate layer, a separating layer, an adhesive layer, a photopolymer layer having at least one holographic element, a carrier layer, and a second thermoplastic intermediate layer. Such a structure advantageously contains few layers and exhibits no undesirable delamination effects, which can occur more frequently when further layers are added.

The first thermoplastic intermediate layer and the second thermoplastic intermediate layer contain or consist of, independently of one another, at least polyvinyl butyral (PVB), ethylene vinyl acetate (EVA), polyurethane (PU), or copolymers or derivatives thereof, preferably polyvinyl butyral (PVB), particularly preferably polyvinyl butyral (PVB), and additives known to the person skilled in the art, such as plasticizers.

The first thermoplastic intermediate layer and the second thermoplastic intermediate layer can, independently of one another, be formed by a single film or also by more than one film.

The first thermoplastic intermediate layer and/or the second thermoplastic intermediate layer can, independently of one another, also be a functional intermediate layer, in particular an intermediate layer with acoustically damping properties, an infrared-radiation-reflecting intermediate layer, an infrared-radiation-absorbing intermediate layer, a UV-radiation-absorbing intermediate layer, an intermediate layer colored at least in some sections, and/or an intermediate layer tinted at least in some sections. For example, the first thermoplastic intermediate layer or the second thermoplastic intermediate layer can, for example, also be a band filter film.

The thicknesses of the first thermoplastic intermediate layer and/or the second thermoplastic intermediate layer are, independently of one another, between 30 μm to 1500 μm, preferably between 50 μm and 760 μm.

The first pane and the second pane are preferably made of glass, particularly preferably soda lime glass, as is customary for window panes. However, the panes can, independently of one another, also be made of other types of glass, for example, quartz glass, borosilicate glass, or aluminosilicate glass, or of rigid clear plastics, for example, polycarbonate or polymethyl methacrylate. The panes can be clear or also tinted or colored. If the composite pane is used as a windshield, it should have sufficient light transmittance in the central field of vision, preferably at least 70% in the primary through-vision region A in accordance with ECE-R43.

The first pane, the second pane, the first thermoplastic intermediate layer, and/or the second intermediate layer can have suitable coatings known per se, for example, antireflection coatings, nonstick coatings, anti-scratch coatings, photocatalytic coatings, or solar protection coatings or low E coatings. In the case of solar protection coatings, coatings that are as spectrally neutral as possible are preferred and/or these are preferably applied on the first thermoplastic intermediate layer or on the first pane, in particular on the inner surface of the first pane.

The thickness of the first pane and the second pane can vary widely and thus be adapted to the requirements in the individual case. The first pane and the second pane preferably have thicknesses of 0.5 mm to 5 mm, particularly preferably of 1 mm to 3 mm, most particularly preferably of 1.6 mm to 2.1 mm. For example, an outer pane has a thickness of 2.1 mm; and an inner pane, a thickness of 1.6 mm. However, the outer pane or in particular the inner pane can also be thin glass with a thickness of 0.55 mm, for example.

The composite pane according to the invention can include one or more additional intermediate layers, in particular functional intermediate layers. An additional intermediate layer can, in particular, be an intermediate layer with acoustically damping properties, an infrared-radiation-reflecting intermediate layer, an infrared-radiation-absorbing intermediate layer, a UV-radiation-absorbing intermediate layer, an intermediate layer colored at least in some sections, and/or an intermediate layer tinted at least in some sections. When multiple additional intermediate layers are present, they can also have different functions.

The invention also includes a projection assembly for displaying information for a viewer, at least comprising a composite pane according to the invention and a projector aimed from the inside at the holographic optical element. The composite pane according to the invention can be implemented as described above in the various embodiments.

The projector emits light at wavelengths to which the holographic optical element is responsive.

Laser projectors are preferred because very discrete wavelengths can be achieved therewith.

The features of the previously described embodiments of the composite pane also refer to the projection assembly, which is thus disclosed with all three described embodiments of the composite pane.

The invention further relates to a method for producing a composite pane according to the invention according to the previously described first, second, or third embodiment, wherein at least:

a) a first pane having an outer surface and an inner surface, a first thermoplastic intermediate layer, a second thermoplastic intermediate layer, a separating layer, an adhesive layer, and a second pane having an outer surface and an inner surface are provided,
b) a photopolymer layer having a holographic optical element is provided, wherein the photopolymer layer is applied on a carrier layer,
c) a layer stack is formed with the following sequence of layers and panes: first pane-first thermoplastic intermediate layer-separating layer-adhesive layer-photopolymer layer having a holographic element-carrier layer-second thermoplastic intermediate layer-second pane,
d) the layer stack is joined by lamination.

The lamination is preferably carried out under the action of heat, vacuum, and/or pressure. Methods known per se can be used for the lamination, for example, autoclave methods, vacuum bag methods, vacuum ring methods, calender methods, vacuum laminators, or combinations thereof.

All composite panes according to the preferred first, second, and third embodiments can be produced with this method. The statements concerning the preferred features of the composite pane are thus also applicable to the method. Reference is hereby made to the above statements with respect to the preferred features.

An advantage of this method is that the holographic optical element is already contained in the layer stack prior to lamination such that steps c) and d) can be carried out in the presence of daylight. This is a particular advantage compared to the prior art, in which the lamination must be carried out with the exclusion of light. Furthermore, thanks to the combination according to the invention of the carrier layer and the separating layer, an adverse effect on the holographic element in the photopolymer layer due to diffusion of plasticizers into the photopolymer layer is prevented. Thanks to the adhesive layer between the separating layer and the photopolymer layer, delamination due to poor adhesion between these layers is prevented.

The invention further relates to a method for producing a composite pane according to the invention according to the previously described first, second, or third embodiment, wherein at least:

a) a first pane having an outer surface and an inner surface, a first thermoplastic intermediate layer, a second thermoplastic intermediate layer, and a second pane having an outer surface and an inner surface are provided,
b) a photopolymer layer having a holographic optical element is provided, wherein the photopolymer layer is arranged in a film laminate having the following layer sequence: separating layer-adhesive layer-photopolymer layer-carrier layer,
c) a layer stack is formed having the following sequence of layers and panes: first pane-first thermoplastic intermediate layer-separating layer-adhesive layer-photopolymer layer having a holographic element-carrier layer-second thermoplastic intermediate layer-second pane,
d) the layer stack is joined by lamination.

The lamination is preferably carried out under the action of heat, vacuum, and/or pressure. Methods known per se can be used for the lamination, for example, autoclave methods, vacuum bag methods, vacuum ring methods, calender methods, vacuum laminators, or combinations thereof.

All composite panes according to the preferred first, second, and third embodiments can be produced with this method. The statements concerning the preferred features of the composite pane are thus also applicable to the method. Reference is hereby made to the above statements.

In this method as well, the steps c) and d) can be carried out in the presence of daylight, significantly simplifying the performance of the production method. Compared to the previously described method, the provision of the photopolymer layer in combination with the carrier layer and the separating layer further contributes to the mechanical stability of the photopolymer layer. In addition, the formation of the layer stack is further simplified thanks to the smaller number of individual layers compared to the previously described embodiment. In addition, the photopolymer layer is protected on both sides during processing by the directly bonded separating layer.

The invention also includes the use of a composite pane according to the invention as interior glazing or exterior glazing in a vehicle or a building, in particular as a vehicle pane in means of locomotion for travel on land, in the air, or on water, in particular in motor vehicles and in particular as a windshield that serves as a projection surface.

Figure 2:
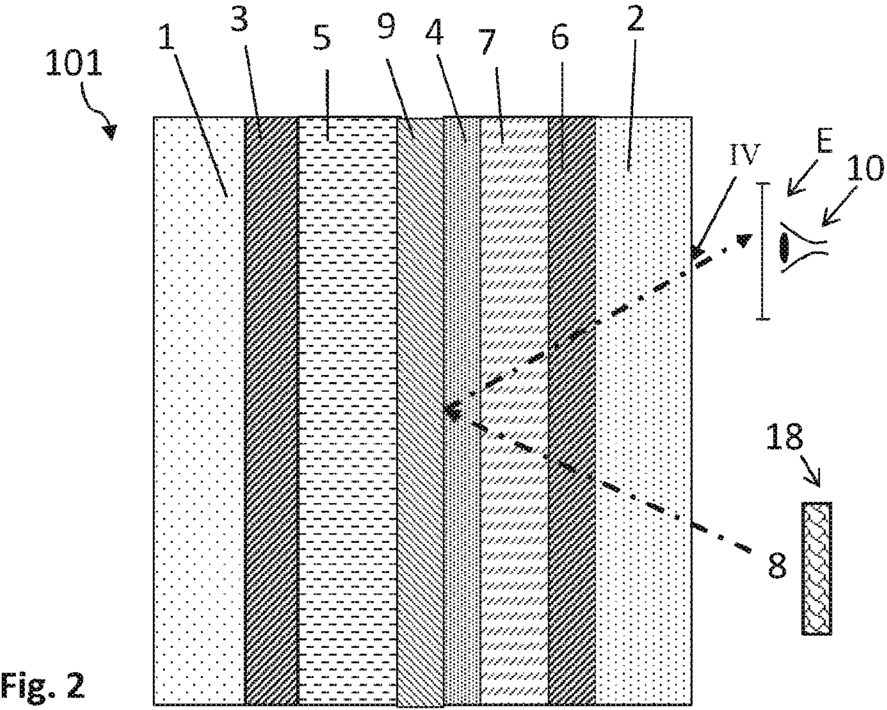
Figure 3:
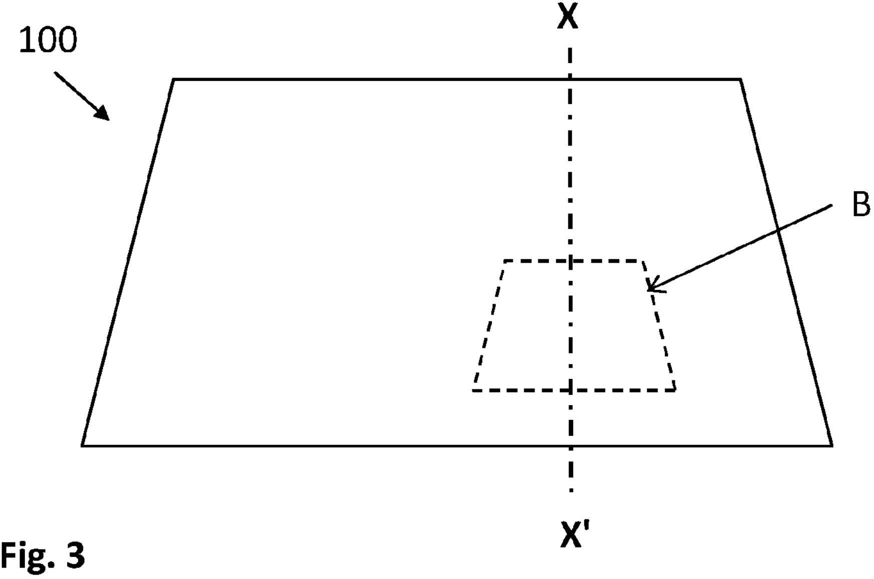
Figure 4:
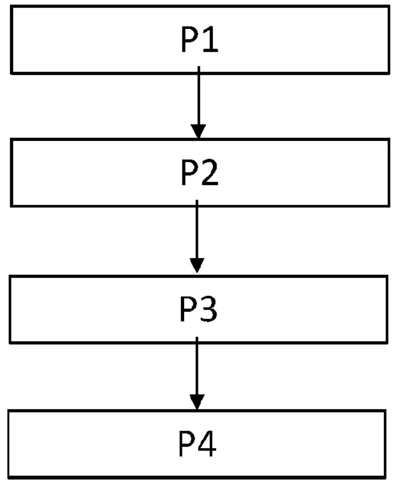

The invention is explained in detail with reference to drawings and exemplary embodiments. The drawings are schematic representations and are not to scale. The drawings in no way restrict the invention. They depict:

FIG. 1 a cross-section of a design according to a first, second, and third embodiment of a composite pane 100 according to the invention, FIG. 2 a cross-section through an embodiment of a projection assembly 101 according to the invention, FIG. 3 a plan view of an embodiment of a composite pane 100 according to the invention, and FIG. 4 an exemplary embodiment of a method according to the invention using a flow chart.

FIG. 1 depicts a cross-section of a design according to a first, second, and third embodiment of a composite pane 100 according to the invention. In the embodiment depicted in FIG. 1, the composite pane 100 has a first pane as an outer pane 1 with an inner surface II and an outer surface I, a first thermoplastic intermediate layer 3, a photopolymer layer having a holographic element 4, a second thermoplastic intermediate layer 6, and a second pane as an inner pane 2 with an inner surface IV and an outer surface III. The photopolymer layer having a holographic element 4 is arranged between the first pane 1 and the second pane 2. The first thermoplastic intermediate layer 3 is arranged between the first pane 1 and the photopolymer layer 4.

The outer pane is made, for example, of soda lime glass and is 2.1 mm thick. The inner pane 2 is made, for example, of soda lime glass and is 1.6 mm thick.

The first thermoplastic intermediate layer 3 and the second thermoplastic intermediate layer 6 are made, in the embodiments depicted in FIG. 1, for example, of polyvinyl butyral (PVB) and are 0.38 mm thick in each case.

A separating layer 5 is arranged between the first thermoplastic intermediate layer 3 and the photopolymer layer 4. The separating layer 5 prevents plasticizers or other added compounds from diffusing out of the first thermoplastic intermediate layer 3 into the photopolymer layer 4 and resulting there in swelling of the photopolymer layer 4, which would adversely affect the holographic element.

An adhesive layer 9 is arranged between the separating layer 5 and the photopolymer layer 4. The adhesive layer 9 improves the adhesion between the photopolymer layer 4 and the separating layer 5 such that delamination between these layers is prevented. The adhesive layer 9 is directly adjacent the photopolymer layer 4 and the separating layer 5. No other layer is arranged between the adhesive layer 9 and the photopolymer layer 4 and between the adhesive layer 9 and the separating layer 5.

The adhesive layer 9 is preferably an optically clear adhesive (OCA). The adhesive layer preferably has a thickness of 20 μm to 200 μm, particularly preferably of 50 μm to 150 μm, most particularly preferably of 60 μm to 100 μm. Good optical properties are thus achieved. In addition, adhesive layers with these thicknesses are commercially available as adhesive films.

The adhesive is preferably a chemically acting, in particular chemically curing or UV curing adhesive, particularly preferably an acrylate adhesive or a silicone-based adhesive.

The photopolymer layer 4 preferably has a thickness of 5 μm to 70 μm, preferably of 10 μm to 50 μm, particularly preferably of 15 μm to 20 μm, for example, 15 μm. Since the photopolymer layer 4 is the most expensive component of the layer stack, it is advantageous to use the thinnest possible photopolymer layer and, for increasing the mechanical stability, to use the photopolymer layer in combination with a carrier layer 7 that is made of a less expensive material.

The photopolymer layer 4 is made of a suitable photopolymer and includes a holographic element. Suitable photopolymer films are commercially available under the name Bayfol® HX.

A carrier layer 7 is arranged between the second thermoplastic intermediate layer 6 and the photopolymer layer 4. The carrier layer 7 serves as a carrier for a photopolymer layer 4 and, at the same time, prevents plasticizers or other added compounds from diffusing out of the second thermoplastic intermediate layer 6 into the photopolymer layer 4 and causing swelling of the photopolymer layer 4 there, which would adversely affect the holographic element in the photopolymer layer. The carrier layer 7 is directly adjacent the photopolymer layer 4, in other words, there is no further layer between the carrier layer 7 and the photopolymer layer 4.

According to a first preferred embodiment, the carrier layer 7 is a polymeric layer and contains or consists of polyethylene terephthalate (PET), polyethylene (PE), polymethyl methacrylate (PMMA), polyvinyl chloride (PVC), and/or cellulose triacetate (TAC). Particularly preferably, the carrier layer is made of polyethylene terephthalate (PET). The carrier layer 7 has a thickness of 20 μm to 100 μm, preferably of 40 μm to 90 μm, particularly preferably of 65 μm to 80 μm. These materials give the photopolymer layer 4 the necessary mechanical stability for the processing to form a composite pane. At the same time, they act as a diffusion barrier for plasticizers and other additives out of the second thermoplastic intermediate layer 6. The carrier layer 7 and the photopolymer layer 4 are in direct contact with one another, in other words, there is no further layer between the carrier layer and the photopolymer layer.

According to the first preferred embodiment, the separating layer 5 is a polymeric layer and contains or consists of polyethylene terephthalate (PET), polyethylene (PE), polymethyl methacrylate (PMMA), polycarbonate (PC), polyamide (PA), polyvinyl chloride (PVC), and/or cellulose triacetate (TAC). Preferably, the separating layer is made of polymethyl methacrylate (PMMA). The separating layer 5 has a thickness of 10 μm to 300 μm, preferably of 40 μm to 200 μm, particularly preferably of 65 μm to 150 μm. These separating layers act as an excellent diffusion barrier for plasticizers out of the first thermoplastic intermediate layer 3. In conjunction with the previously mentioned carrier layers 7, a stable composite pane 100 is obtained after lamination, without adversely affecting the holographic element in the photopolymer layer 4.

FIG. 1 further depicts a second preferred embodiment of a composite pane 100 according to the invention, the layer components of which differ from those of the previously described first embodiment as follows.

The carrier layer 7 is a polymeric layer and contains or consists of polyamide (PA). The carrier layer 7 has a thickness of 20 μm to 100 μm, preferably of 40 μm to 90 μm, particularly preferably of 65 μm to 80 μm. Polyamide gives the photopolymer layer 4 the necessary mechanical stability for the processing to form a composite pane. At the same time, it acts as a diffusion barrier for plasticizers and other additives out of the second thermoplastic intermediate layer 6.

The separating layer 5 is a polymeric layer and contains or consists of polyethylene (PE), polymethyl methacrylate (PMMA), polycarbonate (PC), polyvinyl chloride (PVC), or cellulose triacetate (TAC)). Preferably, the separating layer is made of polymethyl methacrylate (PMMA). The separating layer 5 has a thickness of 10 μm to 300 μm, preferably of 40 μm to 200 μm, particularly preferably of 65 μm to 150 μm. These separating layers act as an excellent diffusion barrier for plasticizers out of the first thermoplastic intermediate layer 3. In conjunction with the previously mentioned carrier layers 7, a stable composite 100 is obtained after lamination, without adversely affecting the holographic element in the photopolymer layer 4. Thanks to the adhesive layer 9, the adhesion between the separating layer 5 and the photopolymer layer 4 is excellent.

FIG. 1 further depicts a cross-section of a design according to a third preferred embodiment of a composite pane 100 according to the invention, the layer components of which differ from those of the previously described first and second embodiments as follows.

The carrier layer 7 is a polymeric layer and contains or consists of polycarbonate (PC). The carrier layer 7 has a thickness of 20 μm to 100 μm, preferably of 40 μm to 90 μm, particularly preferably of 65 μm to 80 μm. Polycarbonate gives the photopolymer layer 4 the necessary mechanical stability for the processing to form a composite. At the same time, it acts as a diffusion barrier for plasticizers and other additives out of the second thermoplastic intermediate layer 6.

The separating layer 5 is a polymeric layer and contains or consists of polyethylene terephthalate (PET), polyethylene (PE), polymethyl methacrylate (PMMA), polycarbonate (PC), polyvinyl chloride (PVC), and/or cellulose triacetate (TAC). Preferably, the separating layer is made of polymethyl methacrylate (PMMA). The separating layer 5 has a thickness of 10 μm to 300 μm, preferably of 40 μm to 200 μm, particularly preferably of 65 μm to 150 μm. These separating layers act as an excellent diffusion barrier for plasticizers and other additives out of the first thermoplastic intermediate layer 3. In conjunction with the previously mentioned carrier layers 7, a stable composite pane 100 is obtained after lamination, without adversely affecting the holographic element in the photopolymer layer 4. Thanks to the adhesive layer 9, the adhesion between the separating layer 5 and the photopolymer layer 4 is excellent.

FIG. 2 depicts a cross-section through an embodiment of a projection assembly 101 according to the invention. The projection assembly 101 comprises a composite pane 100 according to an embodiment depicted in FIG. 1 and a projector 18. The projector 18 is arranged in an interior. The beam path for light emanating from a projector is provided with the reference character 8 in the drawing. The light emanating from the projector 18 strikes the holographic element in the photopolymer layer 4 and activates the hologram. The light emitted by the projector 18 is reflected by the holographic optical element in the photopolymer layer 4 such that the holograms are perceived by a viewer 10 as virtual or real images on the side of the composite pane 100 facing away from him/her, when his/her eyes are situated within the so-called "eyebox E".

FIG. 3 depicts a plan view of an embodiment of a composite pane 100 according to the invention. The region in which the at least one holographic element is arranged is identified in FIG. 3 with the reference character B. FIGS. 1 and 2 depict cross-sections along the section line X-X' of various embodiments. The region B is, for example, the HUD region of a composite pane 100 according to the invention implemented as a windshield.

FIG. 4 depicts an exemplary embodiment of a method according to the invention for producing a composite pane 100 according to the invention in accordance with FIG. 1 with reference to a flow chart, comprising the steps:

- P1 Providing a first pane 1, a first thermoplastic intermediate layer 3, a second thermoplastic intermediate layer 6, a separating layer 5, an adhesive layer 9, and a second pane 2.
- P2 Providing a photopolymer layer having a holographic optical element 4, which is applied on a carrier layer 7.
- P3 Forming a layer stack with the following sequence of layers and panes: first pane-first thermoplastic intermediate layer-separating layer-adhesive layer-photopolymer layer having a holographic element-carrier layer-second thermoplastic intermediate layer-second pane.
- P4 Joining the layer stack by lamination.

All embodiments described with regard to FIG. 1 can be produced by the method described. Providing the photopolymer layer in combination with the carrier film contributes to the mechanical stability of the photopolymer layer and thus improves the lamination result since the forming of the layer stack is considerably simplified thanks to the mechanically stable individual layers.

In an alternative preferred embodiment of a method according to the invention for producing a composite pane 100 according to the invention in accordance with FIG. 1, the steps P1 to P4 are designed as follows:

- P1 Providing a first pane 1, a first thermoplastic intermediate layer 3, a second thermoplastic intermediate layer 6, a second pane 2.
- P2 Providing a photopolymer layer having a holographic optical element 4, which is arranged in a film laminate between a separating layer 5 and a carrier layer 7, wherein an adhesive layer 9 is arranged between the separating layer 5 and the photopolymer layer 4.
- P3 Forming a layer stack with the following sequence of layers and panes: first pane-first thermoplastic intermediate layer-separating layer-adhesive layer-photopolymer layer having a holographic element-carrier layer-second thermoplastic intermediate layer-second pane.
- P4 Joining the layer stack by lamination.

All embodiments described with regard to FIG. 1 can be produced by the method described. Providing the photopolymer layer in combination with the carrier layer and the separating layer and the adhesive layer further contributes to the mechanical stability of the photopolymer layer. In addition, the forming of the layer stack is, compared to the previously described embodiment, further simplified thanks to the smaller number of individual layers. In addition, the photopolymer layer is protected on both sides by the directly bonded separating layer.

LIST OF REFERENCE CHARACTERS

1 first pane
2 second pane
3 first thermoplastic intermediate layer
4 photopolymer layer having a holographic element, photopolymer layer having a holographic optical element
5 separating layer
6 second thermoplastic intermediate layer
7 carrier layer
8 beam path for light emanating from a projector
9 adhesive layer
10 vehicle driver/viewer
18 projector
100 composite pane
101 projection assembly
I outer surface of the first pane 1
II inner surface of the first pane 1
III outer surface of the second pane 2
IV inner surface of the second pane 2
B region of holograms
E eyebox
X-X' section line

The invention claimed is:

1. A composite pane, comprising a first pane, a second pane, a layer stack arranged therebetween, at least comprising following layers in order from the first pane to the second pane: a first thermoplastic intermediate layer, a separating layer, an adhesive layer, a photopolymer layer having at least one holographic element, a carrier layer, and a second thermoplastic intermediate layer, wherein the carrier layer contains polyethylene terephthalate (PET), polyethylene (PE), polymethyl methacrylate (PMMA), polyvinyl chloride (PVC), cellulose triacetate (TAC) and any combination thereof and has a thickness of 20 μm to 100 μm, wherein the carrier layer is arranged directly adjacent the photopolymer layer, the separating layer contains polyethylene terephthalate (PET), polyethylene (PE), polymethyl methacrylate (PMMA), polycarbonate (PC), polyamide (PA), polyvinyl chloride (PVC), cellulose triacetate (TAC) and any combination thereof and has a thickness of 10 μm to 300 μm, and the adhesive layer is arranged directly adjacent the photopolymer layer and directly adjacent the separating layer, the adhesive layer being a chemically curing adhesive, wherein the adhesive layer is not a thermoplastic acting adhesive film that bonds by heat during lamination.

2. The composite pane according to claim 1, wherein the carrier layer consists essentially of polyethylene terephthalate (PET), polyethylene (PE), polymethyl methacrylate (PMMA), polyvinyl chloride (PVC), or cellulose triacetate (TAC).

3. The composite pane according to claim 1, wherein the carrier layer has a thickness of 40 μm to 90 μm.

4. The composite pane according to claim 1, wherein the separating layer consists essentially of polyethylene terephthalate (PET), polyethylene (PE), polymethyl methacrylate (PMMA), polycarbonate (PC), polyamide (PA), polyvinyl chloride (PVC), or cellulose triacetate (TAC).

5. The composite pane according to claim 1, wherein the separating layer has a thickness of 40 μm to 200 μm.

6. The composite pane according to claim 1, wherein the adhesive layer is an optically clear adhesive.

7. The composite pane according to claim 1, wherein the adhesive layer has a thickness of 20 μm to 200 μm.

8. The composite pane according to claim 1, wherein a thickness of the photopolymer layer is between 5 μm and 70 μm.

9. The composite pane according to claim 1, wherein the layer stack arranged between the first pane and the second pane consists of the following layers: a first thermoplastic intermediate layer, a separating layer, an adhesive layer, a photopolymer layer having at least one holographic element, a carrier layer, and a second thermoplastic intermediate layer.

10. The composite pane according to claim 1, wherein the first thermoplastic intermediate layer or the second thermoplastic intermediate layer, or both the first and second thermoplastic intermediate layers, contain polyvinyl butyral (PVB), ethylene vinyl acetate (EVA), polyurethane (PU), or copolymers or derivatives thereof.

11. The composite pane according to claim 1, wherein the first thermoplastic intermediate layer or the second thermoplastic intermediate layer, or both the first and second thermoplastic intermediate layers, consist essentially of polyvinyl butyral (PVB), ethylene vinyl acetate (EVA), or polyurethane (PU).

12. The composite pane according to claim 1, wherein the first pane or the second pane, or both the first and second panes, are made of glass.

13. A projection assembly comprising a composite pane according to claim 1 and a projector that is aimed at the holographic element, wherein the projector is a laser projector.

14. A method for producing a composite pane according to claim 1, comprising:

a) providing a first pane, a first thermoplastic intermediate layer, a second thermoplastic intermediate layer, a separating layer, an adhesive layer, and a second pane, b) providing a photopolymer layer having a holographic element, wherein the photopolymer layer is applied on a carrier layer, c) forming a layer stack with the following sequence of layers and panes: first pane-first thermoplastic intermediate layer-separating layer-adhesive layer-photopolymer layer having a holographic element-carrier layer-second thermoplastic intermediate layer-second pane, d) laminating the layer stack.

15. A method comprising providing a composite pane according to claim 1 as interior glazing or exterior glazing in a vehicle or a building.

16. The composite pane according to claim 2, wherein the carrier layer consists of polyethylene terephthalate (PET).

17. The composite pane according to claim 3, wherein the carrier layer has a thickness of 65 μm to 80 μm.

18. The composite pane according to claim 4, wherein the separating layer consists of polymethyl methacrylate (PMMA).

19. The composite pane according to claim 5, wherein the separating layer has a thickness of 65 μm to 150 μm.

20. The composite pane according to claim 7, wherein the adhesive layer has a thickness of 60 μm to 100 μm.

* * * * *